United States Patent [19]
Spaeth

[11] 3,976,170
[45] Aug. 24, 1976

[54] RAILWAY BRAKE BEAM HEAD

[75] Inventor: Irvin J. Spaeth, Chicago, Ill.

[73] Assignee: Evans Products Company, Des Plaines, Ill.

[22] Filed: June 13, 1975

[21] Appl. No.: 586,666

Related U.S. Application Data

[60] Division of Ser. No. 526,000, Nov. 21, 1974, Pat. No. 3,912,053, which is a continuation-in-part of Ser. No. 386,764, Aug. 8, 1973, abandoned.

[52] U.S. Cl. .................................. 188/236; 29/428
[51] Int. Cl.² .......................................... F16D 65/06
[58] Field of Search .......... 188/236, 242, 243, 244, 188/245, 246; 29/428

[56] References Cited
UNITED STATES PATENTS

| | | | |
|---|---|---|---|
| 856,186 | 6/1907 | Smith | 188/242 |
| 1,910,541 | 5/1933 | Herbert | 188/242 |
| 2,253,031 | 8/1941 | Johnson | 188/236 |
| 2,747,264 | 5/1956 | Buvelot | 188/236 |
| 3,088,557 | 5/1963 | Cabble, Jr. et al. | 188/236 |

*Primary Examiner*—Stephen G. Kunin
*Assistant Examiner*—Edward R. Kazenske
*Attorney, Agent, or Firm*—F. Travers Burgess

[57] ABSTRACT

Railway brake beam head adapted for selective mounting of cast iron shoe or composition shoe and adapted to reject either type of shoe after having been selected for mounting the other type.

3 Claims, 14 Drawing Figures

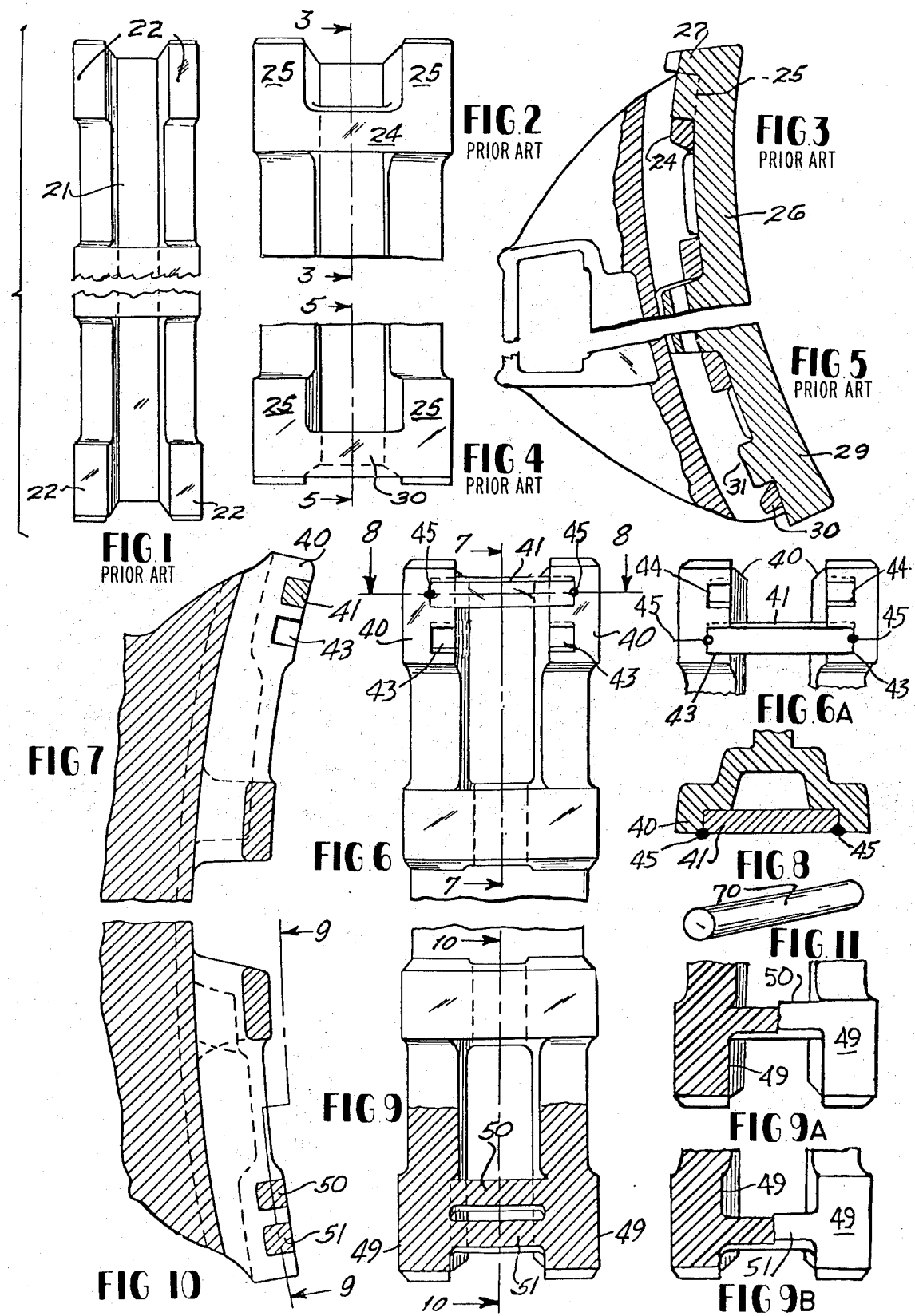

3,976,170

RAILWAY BRAKE BEAM HEAD

CROSS-REFERENCE TO RELATED APPLICATIONS

This application is a division of my copending application Ser. No. 526,000 filed Nov. 21, 1974 now U.S. Pat. No. 3,912,053 which, in turn, is a continuation in part of my application Ser. No. 386,764 filed Aug. 8, 1973 and now abandoned.

BACKGROUND OF THE INVENTION

For many years railway brake shoes were of cast iron and applicable to a head as shown in Moore U.S. Pat. No. 2,266,984. Later the head was rigidified by a crossbar between adjacent toes as shown in Spaeth U.S. Pat. No. 2,587,415. When shoes of high friction composition material were developed to provide increased friction and resistance to wear, the toe crossbars were shifted to exclude application of low friction composition or cast iron shoes. Accordingly it has been necessary for railroad shops to carry a supply of both types of heads in order to service brake beams requiring both types of shoe.

SUMMARY OF THE INVENTION

It is an object of the present invention to provide a brake head which may be utilized for mounting either a low friction composition or cast iron shoe or a high friction composition shoe but when put in service for either type of shoe it will thereafter reject the other type of shoe if an attempt is made to mount the latter.

BRIEF DESCRIPTION OF THE DRAWINGS

FIG. 1 is a front view of the earlier type of brake beam head with spaced toes at each end adapted to mount a cast iron shoe or low friction composition shoes.

FIG. 2 is a front view of the upper end of a later type of brake head with a stiffener crossbar between the toes and adapted to engage a rear lug on a cast iron shoe or low friction composition shoe.

FIG. 3 is a section on line 3—3 of FIG. 2 showing a cast iron shoe applied to the head with its lug engaging the stiffener crossbar.

FIG. 4 is a front view of the lower half of a brake head with a stiffener crossbar between the lower toes and positioned to accommodate a high friction composition shoe.

FIG. 5 is a section on line 5—5 of FIG. 4 with a high friction composition shoe applied.

FIG. 6 is a front view of the upper portion of a brake head embodying one form of the present invention arranged for mounting high friction shoes.

FIG. 6A is a front view corresponding to the upper end portion of FIG. 6 but showing the head arranged for mounting low friction shoes.

FIG. 7 is a section on line 7—7 of FIG. 6.

FIG. 8 is a transverse section on line 8—8 of FIG. 6.

FIG. 9 is a front view and vertical section of the lower portion of a head embodying another form of the invention partially sectionalized along line 9—9 of FIG. 10.

FIG. 9A is a front view corresponding to the lower end portion of FIG. 9 but showing the head arranged for mounting low friction shoes.

FIG. 9B is a front view corresponding to FIG. 11 but showing the head arranged for mounting high friction shoes.

FIG. 10 is a vertical section on line 10—10 of FIG. 9.

FIG. 11 is a perspective of another form of stiffener crossbar.

DETAILED DESCRIPTION

The earlier type of brake head 21 (FIG. 1) illustrates the spaced shoe-supporting toes 22. A development of this type of brake head (FIGS. 2, 3) included an integral crossbar 24 between toes 25 which engaged the back of the shoe 26 and engaged a lip 27 on the latter.

With the advent of high capacity and high tonnage trains, composition shoes were introduced for their greater braking and friction values. Today many railroads have adopted the composition brake shoe as standard on high tonnage cars and such a shoe is shown at 29 in FIG. 5. The brake head crossbar 30 is shaped and positioned to accommodate the rear lug 31 on such a shoe, which obviously could not be applied to a crossbar as shown at 24.

As indicated in FIGS. 2–5, the crossbars 24 and 30 are adapted for different types of shoes but the presence of one type of crossbar will not permit application of a shoe primarily designed for the presence of the other type of crossbar.

Referring now to FIGS. 6, 7 and 8, the toes 40 at the end of the brake head are formed with pairs of opposing sockets 43 and 44 spaced apart lengthwise of the toes, and crossbar 41 is formed separately from the head and has its ends seated in outer sockets 44 in the toes. Sockets 44 are positioned so that crossbar 41 fitted into them will interfere with the rear lug on a low friction shoe and accept a high friction shoe. Crossbar 41 is made slightly larger than the sockets 43 and 44 so that it may be hammered into a selected pair of sockets and form the desired reinforcement of the toes and at the same time accommodate the positioning lug of the selected type of shoe. Crossbar 41 is also tackwelded at its ends to the toes, as shown at 45, to provide permanence and discourage its removal and subsequent modification to mount the wrong shoe on the head. In FIG. 6A crossbar 41 is seated in inner sockets 43, which are positioned such that crossbar 41 will interfere with the rear lug on a high friction shoe and prevent its mounting on the head, while accepting a low friction shoe.

FIG. 9 shows a similar provision of a pair of crossbars 50, 51 integral with toes 49. Either crossbar 50 or 51 could be sawed through adjacent the toes and discarded, as seen in FIGS. 9A and 9B, to accommodate respectively application of low or high friction shoes and prevent application of the other type. Because of the permanent nature of the securement of the remaining crossbars to the head, it would be impossible subsequently to use the brake head for the other type of shoe.

A simpler form of crossbar is shown in FIG. 11 and embodies a cylindrical pin the ends of which could be driven into arcuate sockets in the toes corresponding to sockets 43 and 44 and tackwelded therein.

It will appear that the use of cast iron and composition brake shoes ordinarily would necessitate two different brake heads for their respective use; i.e., the cast iron brake shoe head has toe-tie bars which would reject composition brake shoes; and a composition brake shoe head has toe-tie bars which would reject cast iron brake shoes.

Any of the structures shown in FIGS. 6–11 will eliminate the necessity of stocking separate brake heads for replacing both heads when necessary as either type of head may be used to accommodate the desired shoe mounting.

The exclusive use of other forms of the invention coming within the scope of the appended claims is contemplated.

I claim:

1. A railway brake beam head with a pair of transversely spaced toes at at least one end, said toes having faces adapted for selective mounting engagement with the rear face of either a low friction type brake shoe having a rear lug receivable between said toes or a high friction type brake shoe having a similar lug spaced lengthwise of the shoe from the location of the low friction brake shoe lug, and a pair of reinforcing crossbars extending between said toes at said one end and cast integrally therewith, said crossbars being spaced apart lengthwise of said toes at said one end for interference respectively with the lugs on the different types of shoes, either of said crossbars being selectively removable from said toes prior to application of a brake shoe to leave the other of said crossbars in place and thereby accommodate the mounting of a selected one of said types of brake shoes on the head and prevent the subsequent mounting of the other type of brake shoe on the head by interference of said other crossbar with the rear lug of the other type of brake shoe.

2. A railway brake beam head according to claim 1 wherein the faces of said crossbars are substantially flush with the faces of said toes whereby to abuttingly engage the rear faces of the selected type of brake shoes.

3. A railway brake beam head according to claim 1 formed with similar toes and crossbars at both ends.

* * * * *